United States Patent [19]

Emiliani et al.

[11] Patent Number: 4,810,160
[45] Date of Patent: Mar. 7, 1989

[54] APPARATUS FOR LOADING AND UNLOADING PALLETIZED MATERIAL INTO AND FROM ISOTHERMAL DELIVERY WAGONS OR CONTAINERS

[75] Inventors: Giovanni Emiliani, Castel Bolognese; Maurizio Nati, Casola Valsenio; Elio Sangiorgio, Castel Bolognese, all of Italy

[73] Assignee: Nuova C.O.P.M.A. S.p.A., Castel Bolognese, Italy

[21] Appl. No.: 57,995

[22] Filed: Jun. 4, 1987

[30] Foreign Application Priority Data

Jun. 11, 1986 [IT] Italy .................... 15189/86[U]
Nov. 14, 1986 [IT] Italy .................... 15285/86[U]

[51] Int. Cl.⁴ ............................................. B60P 1/16
[52] U.S. Cl. ........................................ 414/543; 187/9 R; 414/785
[58] Field of Search ............ 414/540–543, 414/785, 626, 589, 590; 187/9 R

[56] References Cited

U.S. PATENT DOCUMENTS

| | | | |
|---|---|---|---|
| 2,446,488 | 8/1948 | Pierce | 414/543 |
| 2,698,097 | 12/1954 | Magnani | 414/626 X |
| 2,857,062 | 10/1958 | Anderson | 414/543 |
| 3,006,486 | 10/1961 | Cook et al. | 414/542 |
| 3,272,365 | 9/1966 | Stevens | 187/9 R X |
| 3,291,261 | 12/1966 | Robb | 187/9 R |
| 3,295,881 | 1/1967 | Worthington | 414/542 |
| 3,561,628 | 2/1971 | Melin | 414/785 X |
| 3,567,054 | 3/1971 | Emke | 414/785 X |
| 4,425,071 | 1/1984 | Dunbar | 414/542 |
| 4,690,609 | 9/1987 | Brown | 414/543 |

FOREIGN PATENT DOCUMENTS

| | | | |
|---|---|---|---|
| 211982 | 11/1960 | Austria | 414/543 |
| 2264678 | 10/1975 | France | 414/542 |

Primary Examiner—Robert J. Spar
Assistant Examiner—David A. Bucci
Attorney, Agent, or Firm—Pollock, Vande Sande & Priddy

[57] ABSTRACT

Apparatus for loading and unloading palletized materials (C) into and from isothermal delivery wagons (F). The apparatus comprises a powered carriage (4) which is longitudinally movable on parallel guides (1,1') secured to the upper interior portion of the wagon (F). A telescopic guiding and lifting/lowering structure connected to the underside of a powered and transversely movable slide (17) and supporting in cantilever fashion a fork (28) for handling the palletized loads (C), comprises at least one jack (26, 26',29) of the multiple-stage single or double-acting type, and preferably of the hydraulic type. The fork (28) is rotated about a vertical axis in order to angularly position it with respect to the load to be handled, and is then locked in such position.

11 Claims, 5 Drawing Sheets

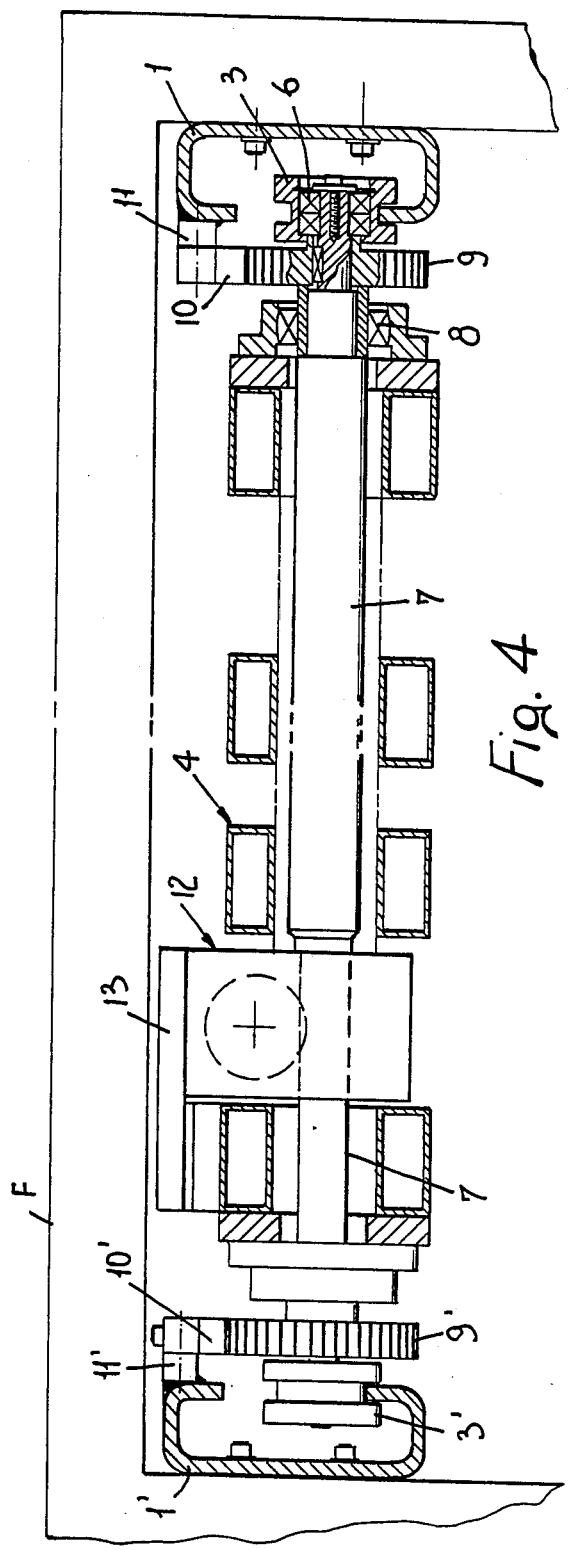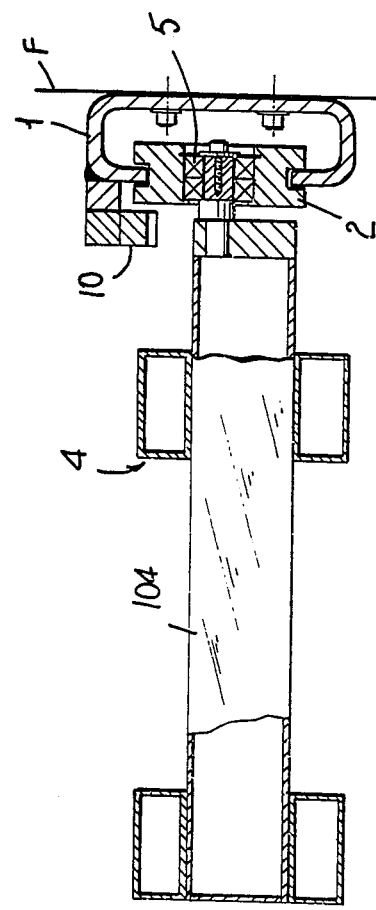

APPARATUS FOR LOADING AND UNLOADING PALLETIZED MATERIAL INTO AND FROM ISOTHERMAL DELIVERY WAGONS OR CONTAINERS

SUMMARY OF THE INVENTION

It is known to provide—in the upper interior portion of isothermal delivery wagons for the transportation of palletized materials—a bridge crane which is longitudinally and transversely movable within said wagons. Depending from a slide which moves transversely to the main carriage, there is a vertical telescopic structure directed downwards and supporting, at the bottom end thereof, an overhanging horizontal fork-shaped structure that, through suitable actuating means, may be selectively lifted or lowered. The carriage is so sized as to protrude from the rear end of the wagon with the portion carrying said transversely-movable slide, whereby the fork may lift palletized loads from the floor and load them into the wagon by arranging them in two layers, or it may conversely effect the unloading operation. In the conventional types of this apparatus, said lifting/lowering telescopic structure has quite often considerable overall dimensions horizontally and/or vertically, which is a limitation in the loading capacity of the wagon that is equipped with such cranes. Moreover, said telescopic structure is often actuated by means of chains or other complicated devices which are scarcely reliable and are bulky.

BRIEF DESCRIPTION OF THE DRAWINGS

The present invention aims to overcome these and other disadvantages with an improved and constructionally simplified apparatus the characteristics and advantages of which will be apparent from the following description, made with reference to the accompanying drawings wherein:

FIGS. 4, 5 and 6 are sectional views on the lines IV—IV, V—V and VI—VI of FIG. 3, respectively showing further constructional details of the apparatus;

DESCRIPTION OF PREFERRED EMBODIMENTS

Figure 2:
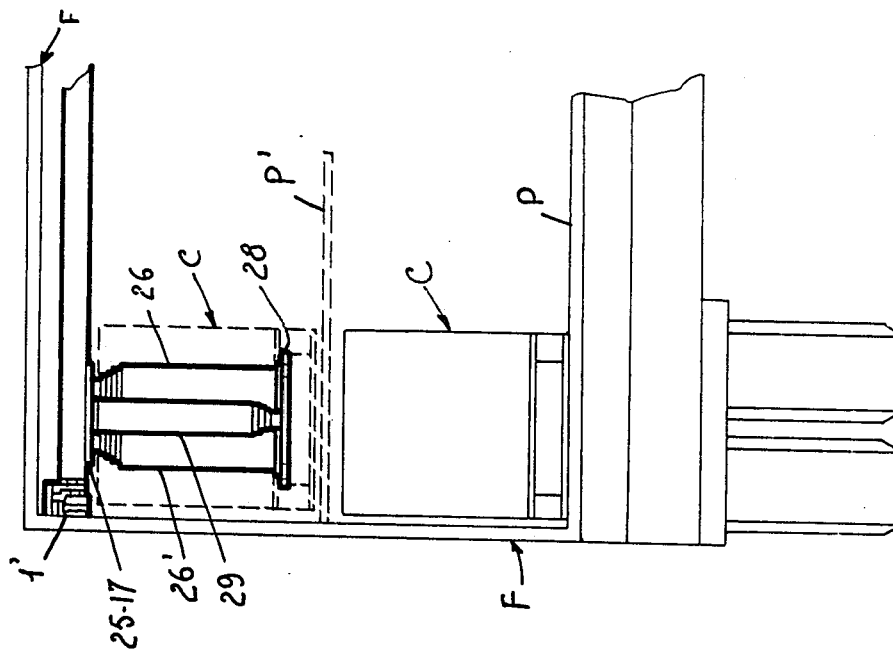
FIGS. 1 and 2 are diagrammatic side and front views, respectively, of the apparatus as applied to a delivery wagon.

With reference to FIGS. 1, 2, 3 and 4, it will be noted that the apparatus comprises a pair of strong, straight, parallel and similar guides 1—1' having a C-shaped cross section, which are fixed horizontally and longitudinally to the top inside portion of the sidewalls of a delivery wagon F throughout the length thereof. Said guide 1—1' are fixed to suitably reinforced portions of the sidewalls of said wagon as conceivable and practicable easily by those skilled in the art.

A horizontal, flat-shaped carriage 4 is supported by said guides 1—1' and travels thereon through its grooved wheels 2—2' and 3—3'. Said carriage, preferably, is made of closed-end tubular sections which are interconnected for containing the hydraulic fluid required for operating the hydraulic power pack or packs (not shown) controlling the apparatus. The wheels 2—2' are arranged at the end of said carriage facing the inner end of the wagon, and the groove and flanges of each of said wheels have diameters which are slightly smaller and larger, respectively, than the spacing between the opposite edges of the C-shaped section of said guides 1—1', whereby said wheels will roll along the upper edge of said guides 1—1' (FIG. 5) and will be guided through their flanges by the lower edges of said guides.

The carriage 4 is formed in the rear and intermediate portion thereof with a recess 100 to avoid any interference between the carriage and the refrigerating unit arranged in the interior top/intermediate portion of the wagon F.

The wheels 2—2' arranged on the portions 104—104' of said carriage 4 are axially in line with each other and are supported by suitable pins through the intermediary of bearings 5 (FIG. 5).

The wheels 3—3' are also axially aligned with each other, are arranged intermediately of the carriage, have a diameter which is equal to or smaller than that of said wheels 2—2' because they cooperate only with the lower edge of the guides 1—1' and are mounted through the intermediary of bearings 6 on the ends of a shaft 7 which is normal to said guides 1—1' and which, in turn, is rotatably supported by the carriage 4 through bearings 8 only one of which can be seen in FIG. 4. Beside the wheels 3—3', said shaft 7 fixedly mounts gear wheels 9—9' having the same characteristics and in mesh with racks 10—10' which are secured parallel to the sides of the guides 1—1' by means of supports 11—11' constituted by shaped bars designed to adjust said racks on said gear wheels and having substantially the same length as the guides. Shaft 7 is coupled with a small reversible geared motor 12 which is secured to one side of the carriage 4 by means of a suitable bracket 13. A flexible coupling 14 is arranged between the reducer gearing and the motor of the unit 12, which is preferably of the hydraulic type.

Fixed to the inner sides of the transverse end section 204 of the carriage 4 and of a transverse section 204' parallel thereto, are co-planar, horizontal and rectilinear U-shaped guides 15—15' whereon a transversely-movable slide 17 rests and travels through its own wheels 16—16'. Fixed on said slide is a nut member 18 co-operating with a screw member 19 which is parallel to the guides 15—15' and is rotatably supported at its end by said carriage 4 through the intermediary of supported bearings 20—20', said screw member being coupled at an end thereof with a small hydraulic motor 21 through a safety coupling and a sprocket and chain drive 22 having a suitable velocity ratio. The motor 21 is fixed to the carriage 4 by means of a bracket 23.

In FIGS. 1, 2, 6 and 7 it will be noted that the slide 17 has affixed to its underside, through the intermediary of at least one vertical-axis bearing 24, a plate 25. Fixed to the underside of said plate 25, symmetrically with respect to the axis of said bearing 24, and the vertical smallest-diameter plungers of two hydraulic multiple-plunger jacks 26—26' having the same characteristics, the cylinder-bodies of which are secured to a horizontal plate 27 carrying the overhanging fork-shaped structure 28 for loading the palletized loads (see below). Said jacks 26—26' are arranged symmetrically with respect to the longitudinal central axis of the fork 28, are preferably of the single-acting type and are actuated in the retraction direction for lifting the fork 28, by means of a power pack arranged on the carriage 4.

A third hydraulic single-acting jack 29 is secured between the plates 25 and 27, and is arranged symmetrically and in an upside-down position with respect to the other two jacks and, preferably, opposite to said fork 28 to fulfill the following operations. First of all, the jack 29 forms, together with the jacks 26—26', a sturdy telescopic structure exempt from oscillations about the vertical axis, thus coupling together the plates 25 and 27 in an absolutely reliable manner. When operated for extension, the jack 29 lowers the fork 28, while the jacks 26—26' are in free-discharge condition. Conversely, when the fork is lifted by means of said jacks 26—26', the discharge circuit of the jack 29 is, preferably, intercepted by a calibrated valve, so that the plate 27 is subject to a force which is opposed to that of the palletized load present on the fork 28, whereby said fork is kept in its correct horizontal operating condition. Substantially, the three single-acting jacks operate together as a single double-acting unit, giving the assembly formed thereby considerable power in both the lifting and lowering steps.

Figure 7:
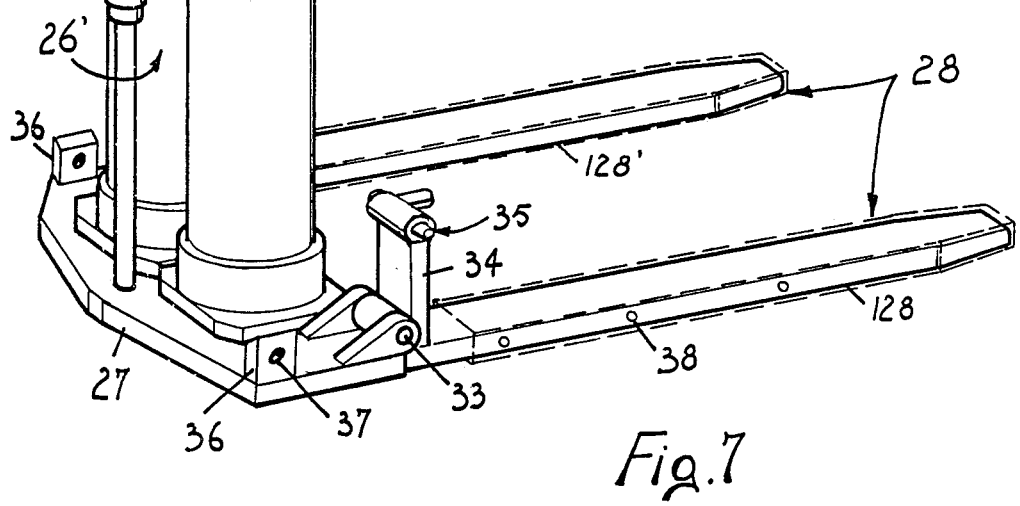
FIG. 7 is a perspective view of the lifter unit carried by the transversely-movable slide of the bridge crane.

It will be noted in FIG. 7 that a number of holes 30 are formed in the plate 25 and these are suitably spaced and are arranged on an imaginary circumference the center of which coincides with the axis of said bearing 24. A latch 31 urged downwards by resilient means, and which may be remotely controlled by means of a small electro-magnet 32 fixed to the body of the slide 17, may snappingly cooperate with said holes. The angular positioning of the fork 28 may thus be locked each time, as required. Moreover, the members 17 and 25 comprise stop means (not shown in the drawings) to limit the extent of the rotation in order to avoid dangerous conditions for the apparatus and the wagon F. In a modified embodiment of the apparatus, the bearing 24 may be replaced by a metal ring toothed on the inner or outer face to cooperate with a servo-control for rotating the plate 25 about its vertical axis. Said servo-control, for example, may be in the form of a rack actuated by a hydraulic jack, or it may be in the form of a pinion or a worm screw actuated by a hydraulic motor. This modification has not been shown in the drawings since it may be easily conceived and constructed by those skilled in the art on the basis of the above description.

Figure 1:
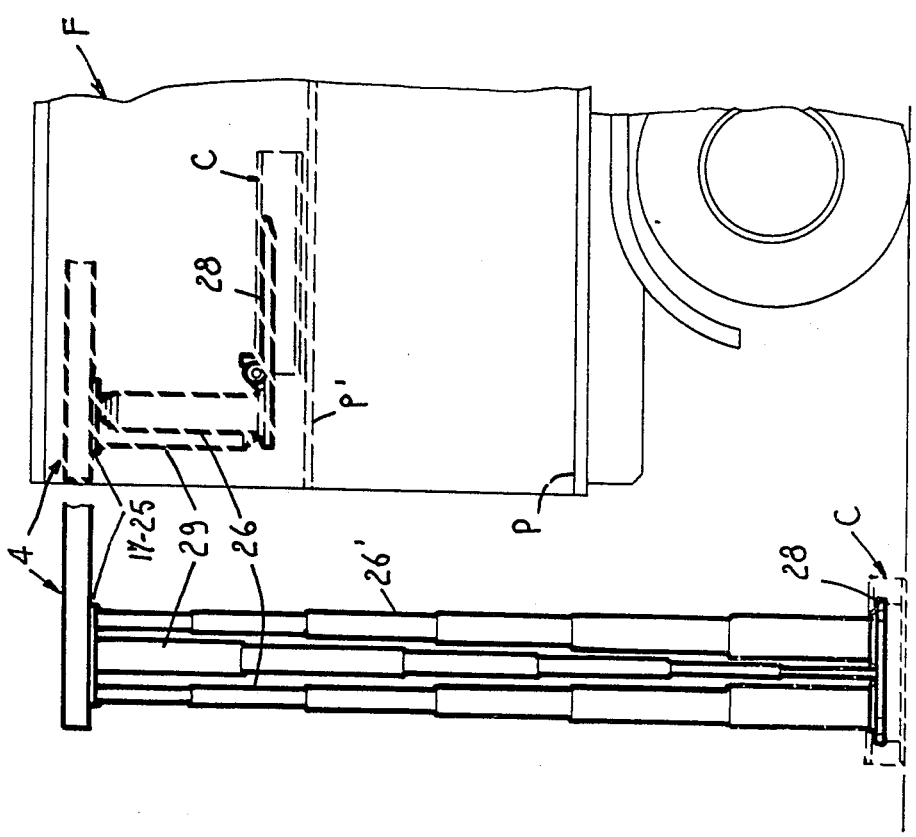
Figure 3:
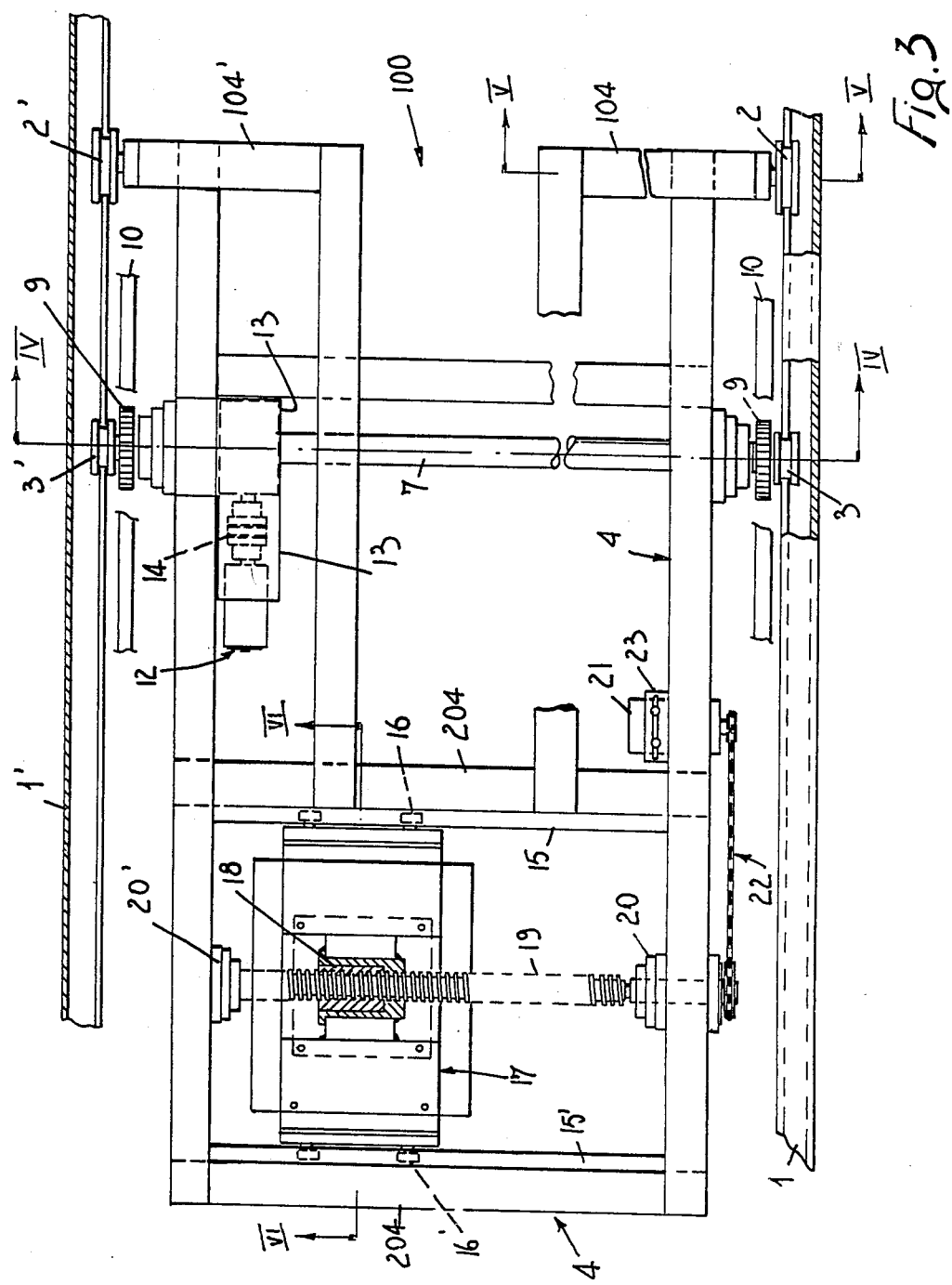
FIG. 3 is a top plan and partly sectional view of the bridge crane with the transversely-movable slide.
Figure 6:
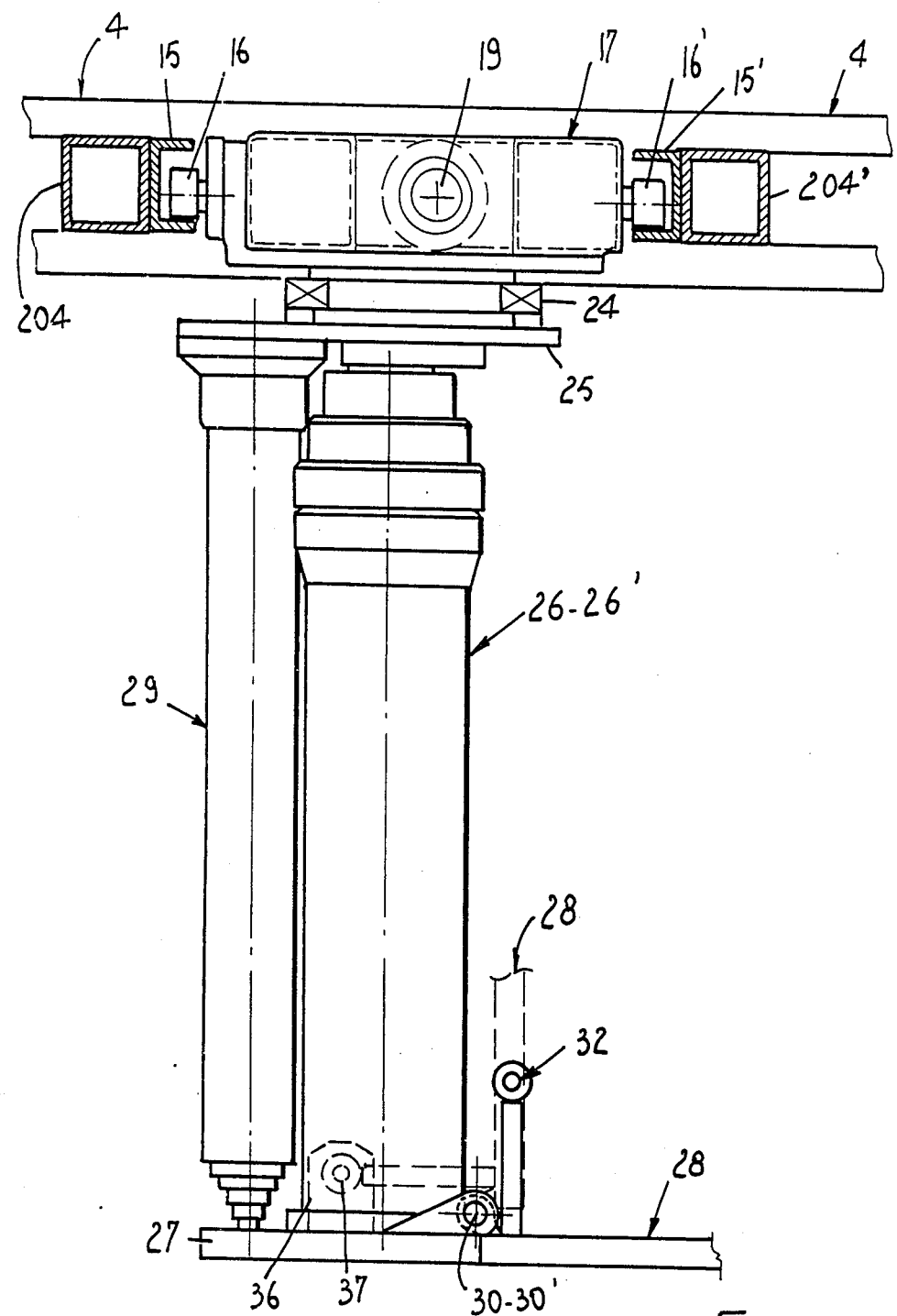
Figure 8:
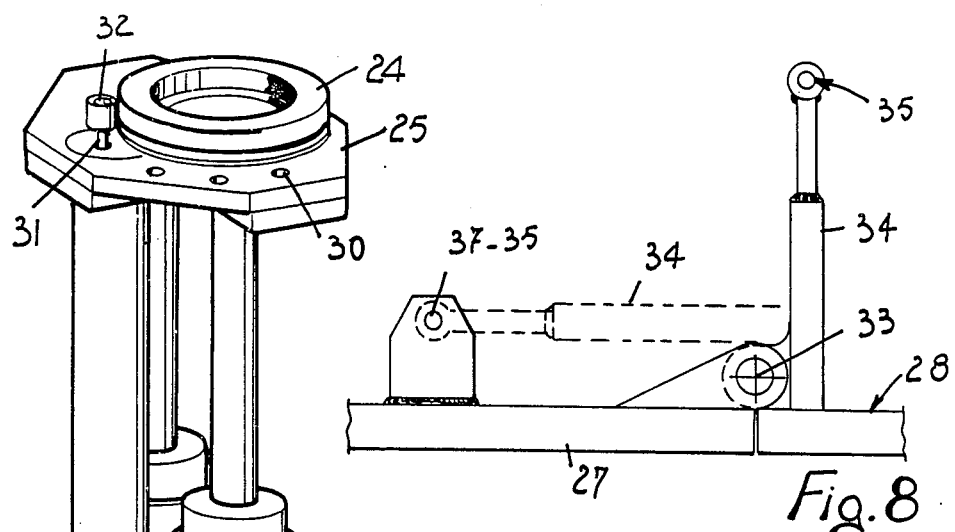
FIGS. 8 and 9 are side and top plan views, respectively, of the device which permits locking of the points of the fork in the vertical position of reduced space-requirement.
Figure 9:
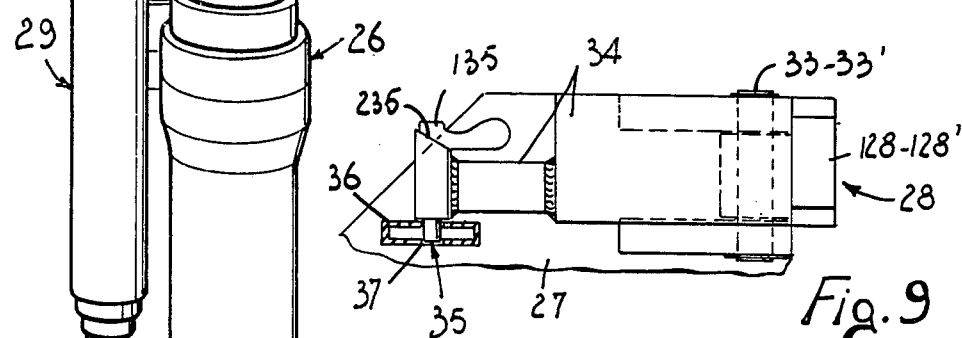

FIGS. 1 and 2 show that the length of the various parts constituting the jacks 26—26' and 29 is such that, when said jacks are in their most retracted condition, said fork 28 may be advantageously positioned above the second loading plane P' of the wagon F, whereas when the carriage 4 is in its most extended position out of the wagon F and when said jacks are completely extended, said fork 28 must be capable of handling palletized loads resting on the floor in proximity of said wagon. The various plungers of the hydraulic jacks 26—26' and 29 are such as to fulfill the double task of telescopic guiding/supporting means and of power means for lifting and lowering the fork 28.

It is apparent from FIGS. 1 and 2 how the apparatus of the invention can arrange the palletized loads C both on the bottom platform P and on the removable upper platform P' of the wagon F, how the contrary or unloading operation can be performed, and how the apparatus can have at rest reduced space requirements by virtue of the reduced horizontal and vertical dimensions of the means for guiding and moving the fork 28. For this same purpose, preferably, the points or teeth 128—128' of the fork 28 are pivoted to the plate 27 by means of hinges 33—33' permitting said points a steady horizontal positioning and permitting when required, i.e., when the apparatus is in its rest position in the wagon, to swing said points upward as shown in broken lines in FIG. 6, so as to bring them closely adjacent the means 26, 26', 29. In order to keep the points of the fork in this rest position, said points are provided, at the hinges 33—33', with perpendicular extensions 34 carrying a conventional latch 35 which, when said points are lifted, engage with an extension 36 fixed to the plate 27 by snapping into a hole 37 in this extension. In order to bring said points back to their horizontal operative condition, the latch 35 is to be disengaged from the extension 36 by rotating the head 135 of said latch, which cooperates with the "flute-mouthpiece" beveled end 235 of the latch support. A resilient means (not shown) urges the latch to its extended position. The upper end of the extension 36 is in the form of an inclined flat to cause the automatic retraction of said latch so that it may then snap back into the hole 37.

Still for the purpose of limiting the overall dimensions of the apparatus when at rest, the points 128—128' of the loading fork may be of telescopic formation, as shown in broken lines in FIG. 7, so as to be either extended or contracted depending upon the requirements. On the telescopic sections of the points 128—128' there may be provided holes 38 whereinto locking latches (not shown) may be inserted.

All the controls of the above apparatus are usually of electro-hydraulic type, and the hydraulic power pack on the carriage 4 is controlled electrically. The operating voltage is supplied either by the electrical system of the vehicle mounting the apparatus and/or by the city mains to which the apparatus may be connected by an extension. Suitable limitsensors, safety valves and stop valves assure safe and correct operation of the apparatus, all in a conventional manner easily conceivable by those skilled in the art.

It is to be understood that minor modifications ensuring the same utility and based on the same inventive principle may be made to the apparatus. For example, these modifications might consist of the replacement of said racks 10—10' with chains controlled by tensioning and compensating resilient means, and of the replacement of said toothed wheels 9—9' with sprockets. The hinges 33—33' may be mounted on the plate 27 through the intermediary of a small slide operated by at least one hydraulic jack and permitting small translatory transverse movements of the loading fork. If the apparatus is designed to handle small loads, only one of the jacks 26—26' may be installed, at the central axis of the fork 28, together with the jack 29. In this instance, the jack 26 may be of the double acting type and the jack 29 may be eliminated and replaced with any telescopic device capable of preventing the rotation and having any positioning with respect to said jack.

Finally, the above apparatus may be installed in places other than isothermal wagons.

We claim:

1. Apparatus for loading and unloading palletized materials into and from isothermal delivery wagons with which said apparatus is permanently associated, said apparatus being of the type comprising a powered carriage (4) which is longitudinally movable on parallel guides (1—1') secured to an upper interior portion of a said wagon (F) and comprising a telescopic guiding and lifting/lowering structure connected to an underside of a powered and transversely-movable slide (17) and supporting in cantilever fashion a fork (28) for handling the palletized loads (C), said telescopic structure comprising only jack means (26, 26', 29) of the multiple-stage type for vertically guiding, lifting and lowering said fork (28), and comprising means for rotating said fork (28) about a vertical axis in order to angularly position said fork with respect to a load to be handled, and means for locking said rotation.

2. Apparatus for loading and unloading palletized materials into and from isothermal delivery wagons with which said apparatus is permanently associated, said apparatus being of the type comprising a powered carriage (4) which is longitudinally movable on parallel guides (1—1') secured to an upper interior portion of a said wagon (F) and comprising a telescopic guiding and lifting/lowering structure connected to an underside of a powered and transversely-movable slide (17) and supporting in cantilever fashion a fork (28) for handling the palletized loads (C), said telescopic structure comprising three jacks (26, 26', 29) of the multiple-stage type arranged at the vertices of a triangle, said structure combining the functions of vertical guide means and a lifting/lowering means for said fork (28), and comprising means for rotating said fork (28) about a vertical axis in order to angularly position said fork with respect to a load to be handled, and means for locking said rotation.

3. Apparatus according to claim 2, wherein the apparatus comprises three said jacks (26, 26', 29) of the single-acting type, two of said jacks being adapted for lifting said fork, and the third of said jacks being adapted for lowering said fork.

4. Apparatus according to claim 3, wherein said jacks (26, 29) are normal to a longitudinal central axis of said fork (28), and said jack (29) for lowering said fork (28) is arranged opposite said fork with respect to said jack (26) for effecting the contrary lifting movement.

5. Apparatus according to claim 4, comprising two said jacks (26—26') for the lifting movement of said fork (28), said jacks being arranged symmetrically with respect to said longitudinal central axis of said fork.

6. Apparatus according to claim 5, wherein an upper supporting member (25) for said fork lifting and lowering jacks (26, 26', 29) is connected to said transversely-movable slide (17) through the intermediary of at least one vertical-axis bearing (24) permitting angular positioning of said fork within a round angle, servo-controlled means (30-31-32) being provided to lock said vertical rotation.

7. Apparatus according to claim 6, wherein points (128—128') of said loading fork (28) are pivoted to a supporting plate (27) by means of transverse hinges (33—33') for swinging said points upwardly to bring them closely adjacent to said lifting/lowering hydraulic jacks (26-26'-29), latch means (35-36-37) being provided to lock said points in their upward position.

8. Apparatus according to claim 7, wherein said points (128—128') of the fork (28) are telescopically adjustable, means being provided for locking said points in required positions.

9. Apparatus according to claim 8, wherein said carriage (4) is actuated through rack-and-pinion units (9—9'-10—10'), pinions of said units being actuated by a reversible motor (12).

10. Apparatus according to claim 9, wherein said slide (17) is actuated through a screw-and-nut device (18, 19) driven by a reversible motor (21).

11. Apparatus according to claim 10, wherein said carriage (4) comprises tubular sections which are closed at their ends and are interconnected so as to constitute a reservoir for liquid required for operating said motors (21, 21).

* * * * *